United States Patent

[11] 3,582,114

| [72] | Inventor | Roger K. Andersen<br>Costa Mesa, Calif. |
|---|---|---|
| [21] | Appl. No. | 833,098 |
| [22] | Filed | June 13, 1969 |
| [45] | Patented | June 1, 1971 |
| [73] | Assignee | Ex-Cell-O Corporation<br>Detroit, Mich. |

[54] SWIVEL CONNECTOR
7 Claims, 5 Drawing Figs.

[52] U.S. Cl. ............................................ 285/263
[51] Int. Cl. ............................................ F16l 27/04
[50] Field of Search .......................................... 285/263, 261, 266

[56] References Cited
UNITED STATES PATENTS

| 872,121 | 11/1907 | Greenlaw | 285/263 |
| 1,974,780 | 9/1934 | Mann | 285/266X |
| 2,025,113 | 12/1935 | Laurent | 285/261 |
| 2,846,242 | 8/1958 | Drake | 285/263 |
| 2,864,630 | 12/1958 | Breitenstein | 285/261 |
| 3,451,698 | 6/1969 | Chakroff | 285/263X |

FOREIGN PATENTS

| 520,715 | 5/1940 | Great Britain | 285/263 |
| 685,568 | 1/1953 | Great Britain | 285/261 |

Primary Examiner—Dave W. Arola
Attorney—Nienow & Frater

ABSTRACT: A swivel connector for conducting fluid under pressure, characterized by having two members to be angularly disposed with respect to each other in any desired plane. The connector comprises an arcuate sealing element attached to one of the members and urged into sealing engagement with the other. Such element is formed with a constant radius about a predetermined point on the member to which the arcuate element is attached. Further sealing connection is provided between the member carrying the arcuate element and a sealing member, this seal also being affected by means of a spherical surface formed about the aforementioned predetermined point.

PATENTED JUN 1 1971   3,582,114
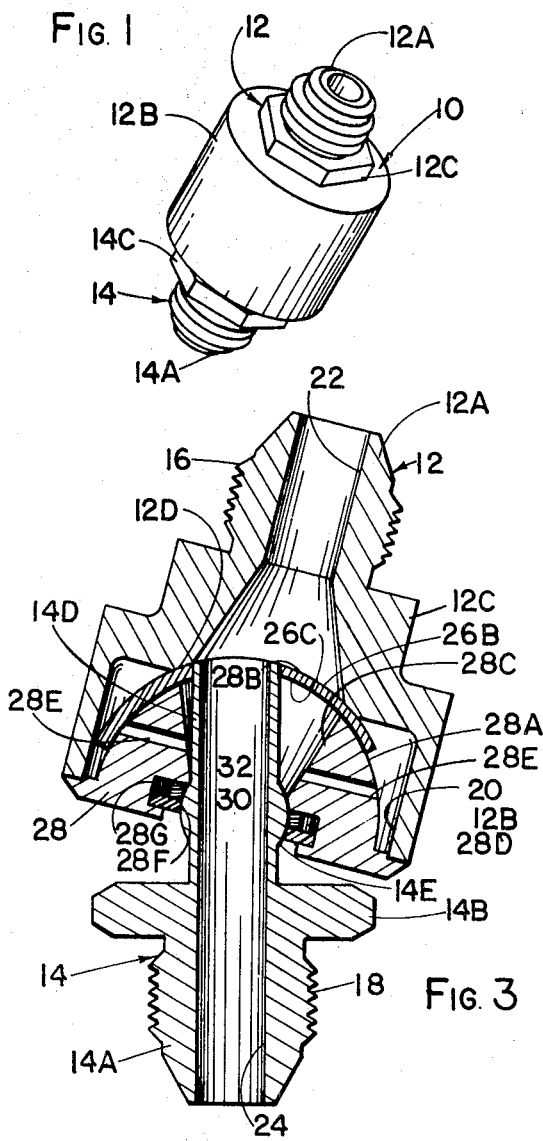
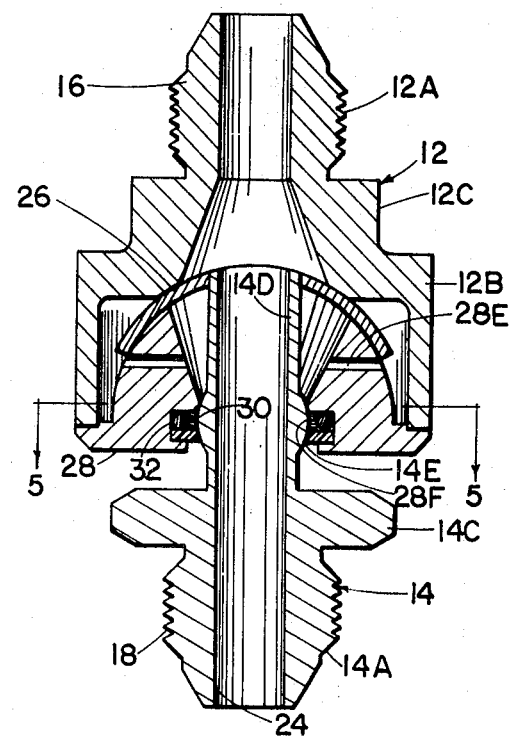
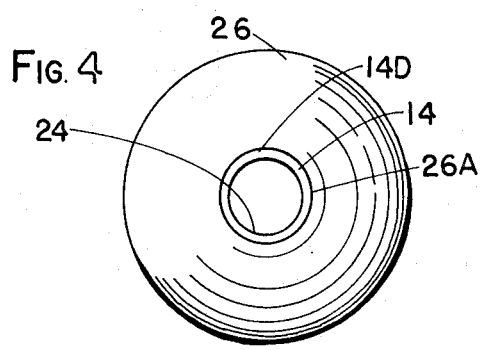
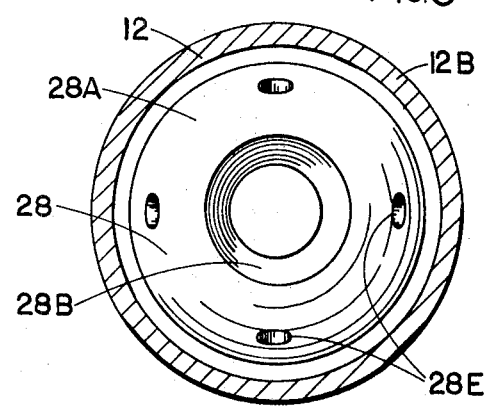
INVENTOR
ROGER K. ANDERSEN
BY
Niemow & Frater
ATTORNEYS

SWIVEL CONNECTOR

The present invention relates generally to swivel connectors for carrying or conducting fluids and more particularly to such devices which are free of malfunctions such as leaking.

In the handling of fluids under pressure, as for instance in hydraulic systems of substantially every type and kind, it is desirable to be able to direct the hydraulic fluid in substantially any desired direction. To accomplish this, various types of fittings and connectors have been originated, but all of them exhibit certain undesirable operational difficulties.

It has been the desire for some period of time to provide a swivel connector which can be employed between several fluid conduits, to enable the fluid to be diverted from one direction to another. Devices heretofore employed for this purpose have proved unsatisfactory under even ordinary operating conditions. Primarily, such prior connectors have been subject to leakage due to the fact that the fluid under pressure therein has been able to circumvent or bypass sealing means heretofore employed.

The present invention provides a swivel connector having cup-shaped surfaces between various members, all such cup-shaped surfaces having a constant radius with all radii emanating from a single pivot point. Such pivot point is that point about which the several major parts of the connector swivel with respect to each other, thus ensuring that maximum fluid pressure seals can be maintained and optimum swivel action can be afforded.

It is an object of the present invention to provide a swivel connector for conducting fluids under pressure, which connector substantially prevents leakage of fluids therefrom.

Another object of the present invention is to provide a swivel connector as characterized above wherein the relative rotational movement between the several angularly disposable members of the connector and the sealing elements for preventing leakage are caused to operate about a single pivot point.

A further object of the present invention is to provide a swivel connector as characterized above having a cup-shaped bearing member formed with a constant radius, said bearing member being attached to one of the members such that the radius emanates from a predetermined point thereon.

A still further object of the present invention is to provide a swivel connector as characterized above which can be disposed at any desired angular position without creating excessive or extraneous pressures on the swivel connector.

Another object of the present invention is to provide a swivel connector as characterized above wherein pressures within different areas or recesses of the connector are substantially equal.

A still further object of the present invention is to provide a swivel connector as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a perspective view of a swivel connector according to the present invention;

FIG. 2 is a longitudinal sectional view of such swivel connector;

FIG. 3 is a longitudinal sectional view showing the connector in an angularly disposed or offset position;

FIG. 4 is an end view of one of the connector members; and

FIG. 5 is a transverse sectional view taken substantially along line 5-5 of FIG. 2 of the drawings.

Like reference characters indicate corresponding parts throughout the several views of the drawings.

Referring to FIG. 1 of the drawings, there is shown therein a swivel connector 10 in accordance with the present invention. It comprises a first connector member 12 which is pivotally connected to a second connector member 14.

As will be readily apparent to those persons skilled in the art, the subject invention has many applications and adaptations, such that it can be provided with substantially any type of end connections to be connected in series arrangement with conduits, pipes or devices having openings and passageways. The embodiment shown in the drawings has members 12 and 14 formed with external pipe threads 16 and 18, respectively, which threads are to sealingly engage internal fastening threads of like construction. On the other hand, it is within the purview of this invention that internal threads could be employed in place of the external threads 16 and 18, or annular flanges and locking collars could be used, if desired. In addition thereto, there are various other connection means for making a fluidtight connection between communicating openings, as taught by the current state of the art.

Connector member 12 is formed generally symmetrically about a longitudinal axis. One end 12a of connector member 12 is formed with the external threads 16 as shown. This end 12a is of reduced diameter, whereas the opposite end 12b is enlarged. End portion 12b is formed with a generally circular recess 20 which communicates with an opening 22 formed in end portion 12a and intermediate portion 12c of member 12. Within the intermediate portion 12c opening 22 is flared or tapered outwardly toward the recess 20, as shown in the drawings.

The other connector member 14 is formed with a longitudinal through opening 24 having a centerline about which said member 14 is generally symmetrically constructed.

Member 14 is formed with an end portion 14a wherein the external threads 18 are provided. An enlarged intermediate portion 14b may be provided, and as shown in FIG. 1 of the drawings, may be formed with wrench receiving means such as the hexagonal configuration 14c. The opposite end 14d of member 14 is of substantially constant reduced diameter.

As shown most clearly in FIG. 4 of the drawings, there is provided at end portion 14d of member 14, a cup-shaped or arcuate bearing member 26. Element 26 is formed with a centrally located opening 26a the marginal edge of which is secured to the end portion 14d of member 14 as by welding, brazing, soldering or the like as shown most clearly in FIGS. 2, 3 and 4 of the drawings. Element 26 is formed with a constant radius throughout both its convex and concave surfaces. Such radius emanates from a single predetermined point along the centerline of member 14. This structural feature is germane to the present invention as will hereinafter become more apparent.

Connector member 12, for cooperation with arcuate bearing element 26, is formed with an arcuate surface 12d which is concave in nature so as to conform to the convex surface 26b of element 26. That is, the arcuate surface 12d is annular in nature and is ground or cut so as to have a constant radius emanating from the single point from which the radius for the surface 26b is developed. This is to insure that the convex surface 26b bearingly engages the surface 12d of member 12 throughout the entire relative rotational or pivotal movements of the members 12 and 14.

Mounted on the enlarged end portion 12b of member 12 is a bearing member 28. This member too is formed substantially symmetrically about a longitudinal centerline and is formed with a generally hemispherically surface as at 28a.

The bearing member 28 is formed with a through opening 28b which is tapered or flared outwardly as at 28c. An annular ledge or marginal edge 28d is formed about the periphery of member 28 for engagement with the enlarged end portion 12b of connector member 12. Such members are firmly and hermetically sealed together as by welding, brazing, soldering or the like, as will be readily apparent to those persons skilled in the art.

For reasons which will be hereinafter more apparent, bearing member 28 is formed with a plurality of pressure equalizing ports 28e for enabling the various parts to move with respect to each other without building up objectionable pressures.

The bearing member 28 is further formed with a partial spherical surface 28f which engages the surface 14e of connector member 14. The latter surface, namely surface 14e, is formed in connector member 14 with a constant radius and about the precise point used in forming the arcuate surfaces of element 26. The same is true of the surface 28f of bearing member 28, namely that it is formed in a partial sphere, from the precise point of the formation of the arcuate surfaces of element 26.

An annular recess 28g is formed at the surface 28f of member 28, as shown, to receive annular sealing members which may take the form of an O-ring 30 and a backup ring 32. The O-ring 30, of course, is formed of flexible material for sealing engagement with the partial spherical surface 14e of connector member 14.

The hemispherical surface 28a of member 28 is formed so as to bearingly engage the concave surface 26c of arcuate member 26.

Connector 10 is connected in series circuit flow arrangement with any appropriate conduits or devices having passageways therein. By virtue of the fact that all of the surfaces which require relative movement for the swivel function are formed from the same single point, the same fluidtight seal is maintained throughout any and all pivotal movements of the members 12 and 14. That is, the bearing member 28 not only hermetically seals the enlarged end portion 12b of member 12, but also urges arcuate member 26 into bearing engagement with the surface 12b of member 12. At the same time, the hemispherical surface 28a of said member 28 bearingly engages the concave surface 26c of said element. This enables such arcuate element 26 to freely move in any direction between the surfaces 12d and 28a without in any way altering the sealing effect therebetween. Since the surfaces 28f and 14e are also formed from the same pivot point, there is no change in the sealing effect between the members 14 and 28 throughout any and all such pivotal movements of the connector members 12 and 14.

The flared portion 28b of the through opening in bearing member 28 accommodates the relative movement between members 12 and 14. In like fashion, the flared or tapered portion of the through opening 22 in member 12 facilitates communication between the openings 22 and 24 without requiring the fluid to make damaging abrupt changes in its direction of flow.

It is thus seen that the present invention provides a swivel connector for conducting fluids under pressure, which connector is so constructed as to minimize leakage or the loss of fluid. This is particularly advantageous for use in hydraulic systems where the fluids are less viscous and prone to leaking through relatively minute openings or cracks.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A swivel connector for fluid flow comprising in combination, first and second flow members individually formed with a longitudinal through opening and adapted for connection with passageway means, a cup-shaped element formed with a central circular opening and fixed to said first member with the marginal edge of said circular opening about one end of said opening in said first member, with said element being formed with convex and concave cup-shaped surfaces of constant radius, the radii for said convex and concave surfaces emanating from a single predetermined point along the centerline of said through opening in said first member, said second flow member being formed with a concave cup-shaped surface engageable by the convex surface of said element throughout relative rotational movement of said members, and a sealing member having a convex surface and being operatively interposed against said element and said second member to urge the convex surface of said sealing member into engagement with the concave surface of said element and the convex surface of said element into sealing engagement with said concave cup-shaped surface of said second member, said first member being further formed with a spherical sealing surface of constant radius about said predetermined point engageable by said sealing member to prevent fluid flow therebetween.

2. A swivel connector for fluid flow according to claim 1, wherein flexible sealing means is interposed between said sealing surface of said first member and said sealing member to prevent fluid flow therebetween.

3. A swivel connector for fluid flow according to claim 2, wherein said sealing member is formed with a central opening for receiving said first member, said central opening being tapered to permit rotational movement of said first member within said sealing member.

4. A swivel connector for fluid flow according to claim 3, wherein pressure relief openings are formed in said bearing member to equalize fluid pressure on said arcuate element during relative rotational movement of said first and second members.

5. A swivel connector for fluid flow according to claim 4, wherein said second member is formed with a through opening having a tapered end portion for communication with the through opening in said first member.

6. A swivel connector for fluid flow comprising in combination, first and second flow members individually formed with a longitudinal through opening and adapted for connection with passageway means, a cup-shaped element formed with a central circular opening and fixed to said first member with the marginal edge of said circular opening about one end of said opening in said first member, said element being formed with a convex cup-shaped surface of constant radius emanating from a predetermined point along the centerline of said through opening in said first member, said second flow member being formed with a concave cup-shaped surface engageable by the convex surface of said element through relative rotational movement of said members, and a sealing member operatively interposed against said element and said second member to urge the sealing member into engagement with said element and the convex surface of said element into sealing engagement with said concave cup-shaped surface of said second member, said first member being further formed with a spherical sealing surface of constant radius about said predetermined point engageable by said sealing member to prevent fluid flow therebetween.

7. A swivel connector for fluid flow comprising in combination, first and second flow members individually formed with a longitudinal through opening and adapted for connection with passageway means, a cup-shaped element fixed to said first member, said element being formed with a cup-shaped surface of constant radius, said second flow member being formed with a cup-shaped surface of constant radius engageable by the cup-shaped surface of said element throughout relative rotational movement of said members, and a sealing member operatively interposed against said element and said second member to urge the cup-shaped surface of said element into sealing engagement with the cup-shaped surface of said second member, said first member being further formed with a spherical sealing surface of constant radius emanating from the point of emanation of the constant radius of said element engageable by said sealing member to prevent fluid flow therebetween.